United States Patent [19]

Mangus et al.

[11] Patent Number: 4,999,896
[45] Date of Patent: Mar. 19, 1991

[54] AUTOMATIC DOUBLE-FLUSH RIVETING

[75] Inventors: William W. Mangus, N. Tonawanda; Ernest K. Krell, Lewiston; Martin L. Gutowski, Lockport, all of N.Y.

[73] Assignee: Gemcor Engineering Corporation, Buffalo, N.Y.

[21] Appl. No.: 426,960

[22] Filed: Oct. 25, 1989

[51] Int. Cl.$^5$ .................... B23P 23/02; B23B 47/02
[52] U.S. Cl. .................... 29/34 B; 29/524.1; 29/525.2; 408/88; 408/95; 408/127; 408/236
[58] Field of Search .................... 29/34 B, 33 K, 564, 29/564.1, 524.1, 524.2; 408/24, 25, 55, 88, 95, 97, 127, 236; 227/51, 58, 61

[56] References Cited

U.S. PATENT DOCUMENTS

| | | | |
|---|---|---|---|
| 2,384,071 | 9/1945 | Boyer | 408/97 |
| 2,722,812 | 11/1955 | Golasky | 408/127 |
| 2,891,427 | 6/1959 | Warsap et al. | 408/236 |
| 3,030,695 | 4/1962 | White et al. | 29/34 B |
| 3,262,340 | 7/1966 | Sammons et al. | 408/97 |
| 3,764,204 | 10/1973 | Kammeraad | 408/97 |
| 4,613,262 | 9/1986 | Woods | 408/236 |
| 4,720,897 | 1/1988 | Orrell et al. | 408/9 |
| 4,850,756 | 7/1989 | Duboi | 408/72 R |

Primary Examiner—Daniel W. Howell
Attorney, Agent, or Firm—Hodgson Russ Andrews Woods & Goodyear

[57] ABSTRACT

A method and apparatus for riveting together workpieces which, in their assembled relationship, have non-parallel exterior surface. Apparatus is provided for clamping the workpieces together between an upper clamp pad and a lower clamp pad, the lower clamp pad being mounted on a spherical bearing so that the lower clamp pad can conform to the workpiece surface. The lower clamp pad is provided with a conical aperture which can act as a pilot for tooling. The tooling is also mounted on spherical bearings so that when the lower clamp pad is in contact with the lower surface of the workpiece, and the tooling is moved towards the workpiece. The tooling will be piloted by the conical aperture to be normal to the surface. After the workpieces are clamped together, the workpieces are drilled from the upper surface and the upper surface is also countersunk. Then tooling is introduced through the lower clamp pad to countersink the lower surface about the drilled aperture with the centerline of the countersink on the lower surface being at right angles to the plane of the lower surface. Next, a rivet having a manufactured head is inserted into the aperture from the upper end and the lower end of the rivet is upset, the upper and lower riveting anvils which are used during the upsetting operation acting together in a vertical work line which is concentric with the centerline of the drilled aperture. Finally, the bucktail portion of the upset rivet, which extends beyond the lower surface of the workpiece, is shaved by a shaver piloted by the lower clamp in such a manner that the axis of the shaver is perpendicular to the plane of the lower surface to thereby provided a shaved aerodynamic surface.

5 Claims, 7 Drawing Sheets

LOWER RIVET HEAD SHAVED FLUSH AND NORMAL TO SURFACE

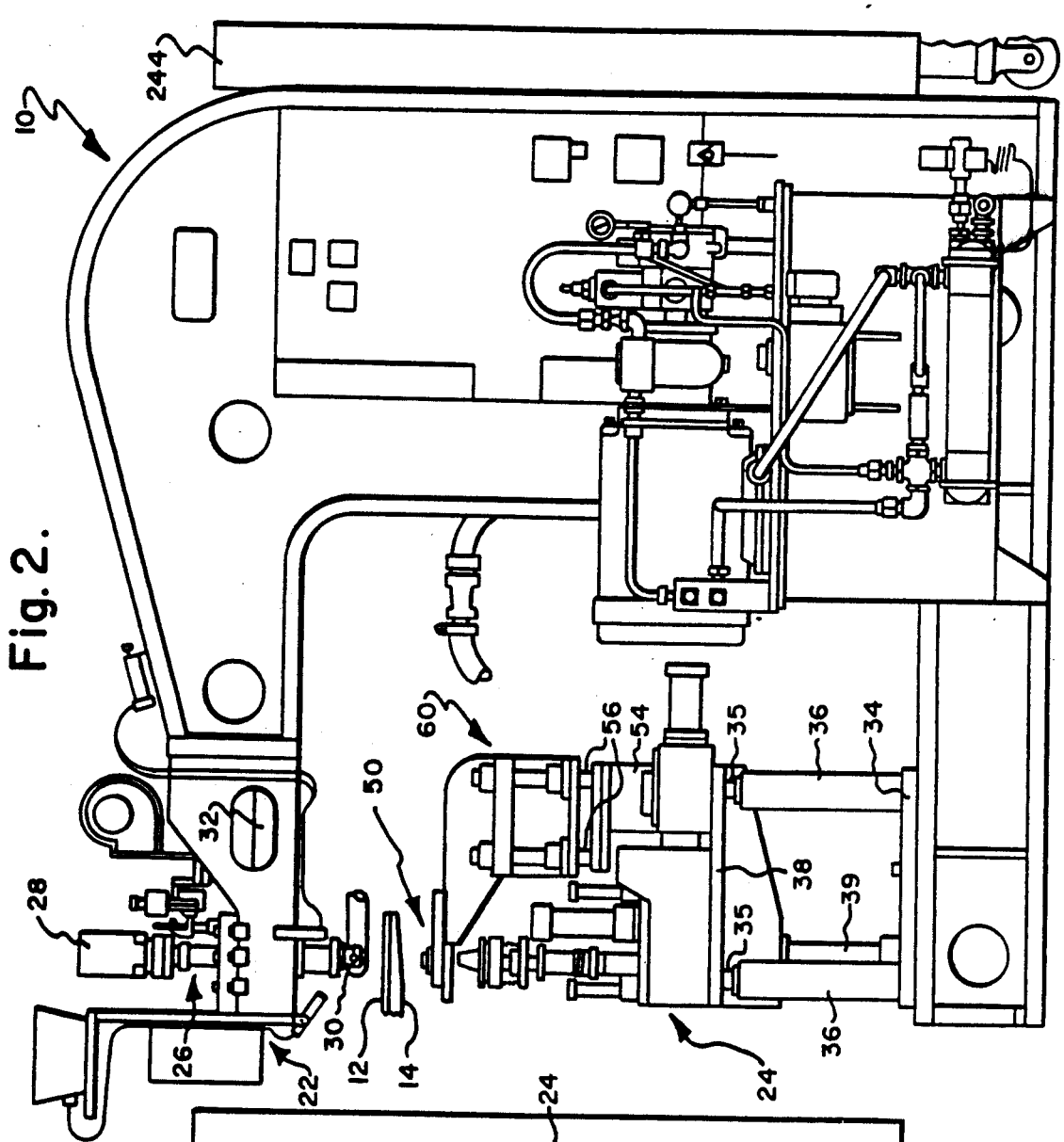
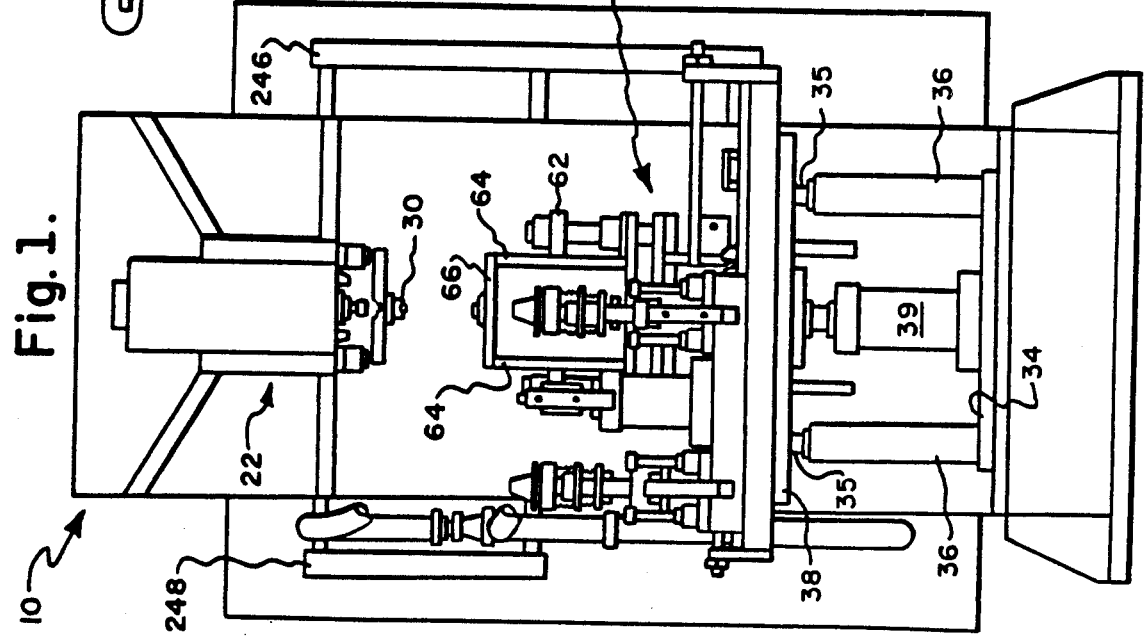

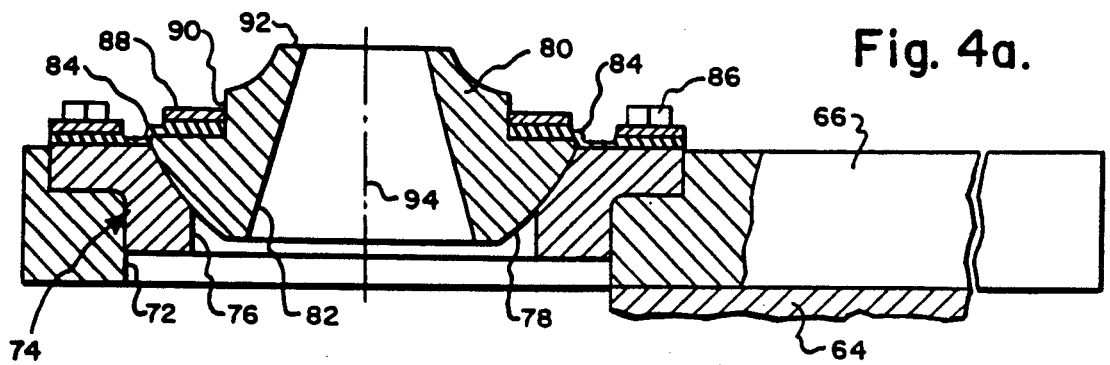
Fig. 4a.
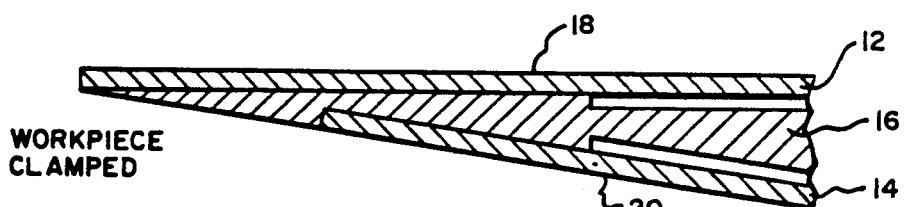
Fig. 9a. WORKPIECE CLAMPED
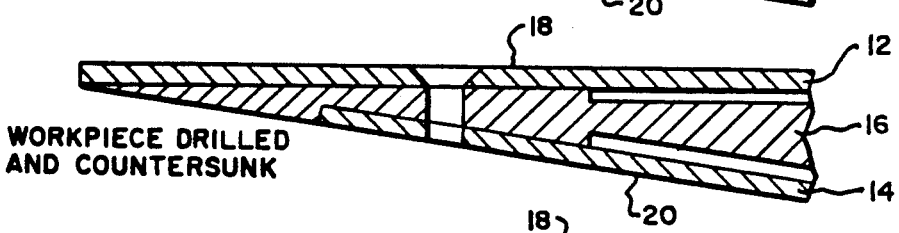
Fig. 9b. WORKPIECE DRILLED AND COUNTERSUNK
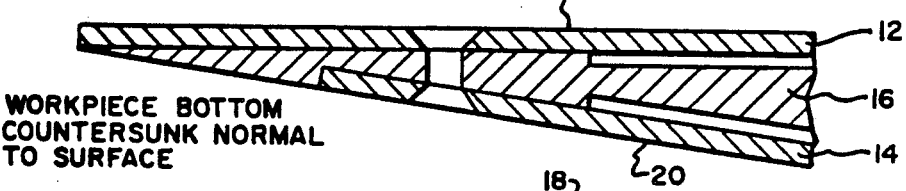
Fig. 9c. WORKPIECE BOTTOM COUNTERSUNK NORMAL TO SURFACE
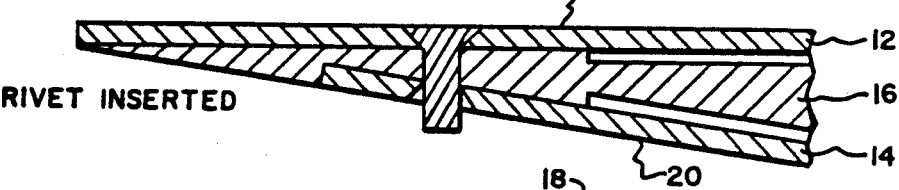
Fig. 9d. RIVET INSERTED
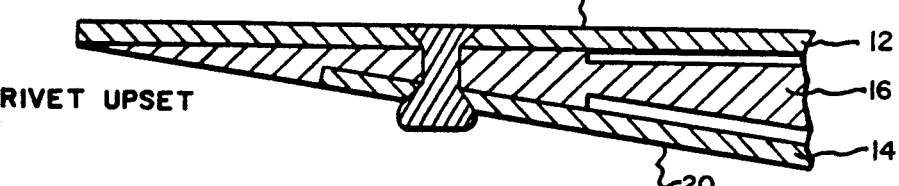
Fig. 9e. RIVET UPSET
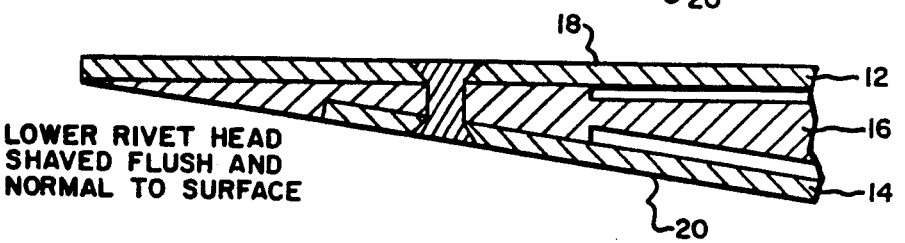
Fig. 9f. LOWER RIVET HEAD SHAVED FLUSH AND NORMAL TO SURFACE

AUTOMATIC DOUBLE-FLUSH RIVETING

TECHNICAL FIELD

The present invention relates to a fastening method and apparatus for securing together workpieces which, in their assembled relationship have non-parallel exterior surfaces. More particularly, the present invention relates to a method and apparatus for riveting together workpieces having exterior surfaces which are not parallel when the workpieces are riveted together, wherein the workpieces are drilled from one side, countersunk from both sides, each countersink being normal to the associated surface, and wherein the rivet bucktail is shaved parallel to the associated workpiece surface.

BACKGROUND

Double-flush riveting is known in the art, the term double-flush riveting referring to a manual or machine accomplished manufacturing process where workpieces having opposed non-parallel surfaces are riveted to each other or to a frame member resulting in a smooth-skinned surface, both ends of the rivet being flush to the associated surface. In one prior art process, this is achieved by clamping the workpieces together between an upper clamp pad and a lower clamp pad. The upper clamp pad has a lower horizontal rigid surface which engages the upper or drill surface of the assembled workpieces. The lower clamp pad is a urethane member which can conform to the lower or shave surface of the workpieces even though the shave surface is at an angle to the upper or drill surface. An aperture is then drilled through the workpieces, the drill and aperture establishing a vertical workline. At the same time the upper or drill surface is countersunk to receive the head of a shear or flush head rivet. After the drilling operation is completed, the lower or shave surface of the workpieces is countersunk, the countersinking tool rotating about the vertical workline to establish a lower countersunk surface which is concentric with the centerline of the aperture. A shear head or flush head rivet is then inserted into the aperture and upset. The bucktail portion of the rivet which extends beyond the plane of the shave surface of the workpieces is then manually ground so that an aerodynamic surface is achieved.

A somewhat automated process has been developed in the past for accomplishing the above. Thus, the workpieces are clamped together, are drilled, and then the surfaces are countersunk with the centerline of the countersunk portions being co-extensive with the centerline of the aperture. After a rivet is inserted and upset, a milling tool or shaver is brought into engagement with the rivet bucktail to shave the same. To this end, the milling tool or shaver is mounted in a gimble-type clamp pad. In actual practice, it has been found while generally satisfactory results may be achieved when there is only a slight difference between the planes of the two surfaces, for example 2 to 3 degrees, that when the angle of the surfaces is greater it has not been practical to mill close to the shave surface of the workpiece without engaging the workpiece. In addition, it has been found through testing during the development of this invention that when the countersunk aperture is formed on the lower or shave side of the workpieces in the manner set fourth above that a good fill of the countersink cannot be achieved consistently when the shave surface is at an angle of more than 3 degrees with respect to the drill surface of the workpiece.

OBJECTS AND SUMMARY OF THE INVENTION

It is an object of the present invention to provide a riveting method and apparatus capable of fully filling countersinks in non-parallel exterior surfaces of workpieces that are being riveted together with the manufactured head the upset portion of a rivet, the bucktail portion of the rivet after upsetting being automatically shaved to lie parallel to the associated exterior skin surface to thereby provide aerodynamic surfaces on both exterior surfaces of the workpieces.

More particularly, it is an object of the present invention to provide a riveting method and apparatus for riveting together workpieces having first and second non-parallel exterior surfaces, wherein an aperture is drilled through the workpieces for the reception of a rivet, the exterior surfaces of the workpieces being countersunk about the drilled aperture, the countersink on each side having a centerline perpendicular to the associated surface of the workpiece, the bucktail portion of the rivet which extends beyond the lower surface of the workpieces after upsetting being automatically shaved to lie parallel to the associated workpiece to form an aerodynamic surface.

Briefly, the foregoing objects as well as additional objects, are accomplished by clamping the workpieces together between an upper clamp pad and a lower clamp pad, the lower clamp pad being mounted on a spherical bearing so that the lower clamp pad can conform to the workpiece surface. The lower clamp pad is provided with a conical aperture which can act as a pilot for tooling also mounted on spherical bearings so that when the lower clamp pad lies normal to the lower or shaved surface of the workpiece the tooling will be piloted to be normal to the surface. Thus, after the workpieces are clamped together, the workpieces are drilled from the upper or drilled surface and the upper surface is countersunk, then the tooling is introduced through the lower clamp pad to countersink the lower or shave surface about the aperture with the centerline of the countersink on the shave surface side being at right angles to the plane of the shave surface, next, a rivet is inserted and then upset, the upper and lower riveting anvils acting together in a vertical workline which is concentric with the line of the drilled aperture. Finally, the bucktail portion of the upset rivet which extends beyond the shaved surface of the workpiece is shaved by a tool piloted by the lower clamp pad in such a manner that the shave tool is normal to the plane of the lower surface to thereby provide a shaved aerodynamic surface.

The foregoing will be more fully understood after a consideration of the following detailed description taken in conjunction with the accompanying drawings in which a preferred form of this invention is illustrated.

BRIEF DESCRIPTION OF THE DRAWINGS

FIG. 1 is a front view of a riveting apparatus in which the principles of the present invention are incorporated.

FIG. 2 is a side view of the apparatus shown in FIG. 1.

FIG. 4a is a further enlarged view of the lower clamp pad assembly shown in FIG. 4.

FIGS. 9a through 9f illustrate a sequence of steps in the practice of the method of this invention.

DETAILED DESCRIPTION

Figure 3:
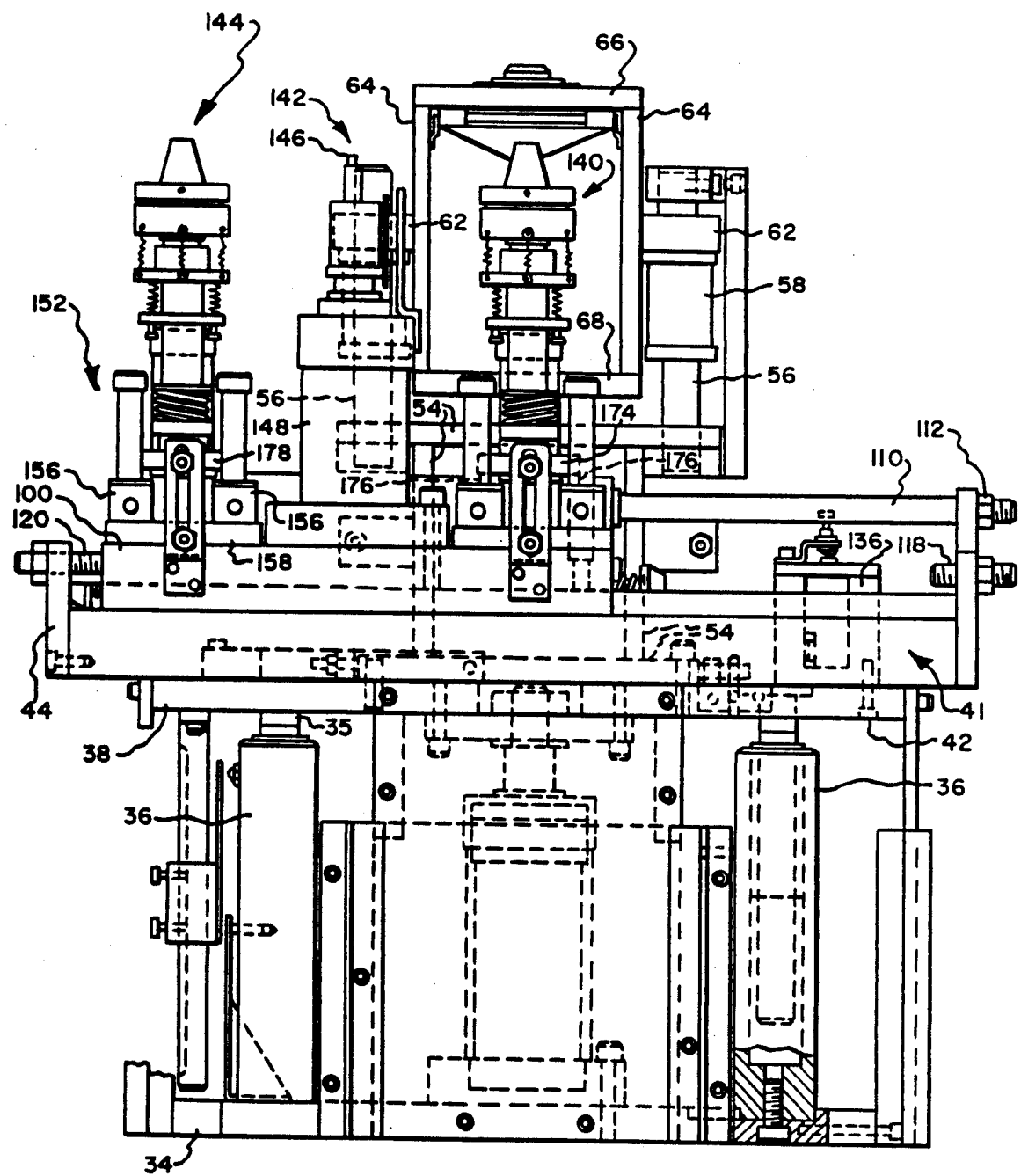
FIG. 3 is an enlarged front view of the lower head assembly shown in FIG. 1.

In the following description right-hand and left-hand reference will be determined with reference to the position the parts occupy in FIG. 1. Similarly, front and rear reference will be determined with reference to the parts occupy in FIG. 2, the front being shown to the left in FIG. 2.

Reference will be made initially to FIGS. 1 and 2 in which the overall apparatus of this invention is illustrated. The apparatus including a flor-mounted main C-shaped frame 10 upon which various components of this invention are mounted. The workpieces which are to be riveted together are shown at 12 and 14 in FIG. 2. While only two workpieces are shown in FIG. 2, it should be appreciated that typically the workpieces 12 and 14 will be aerodynamic skins which are riveted to a frame member 16, this being best illustrated in FIG. 9a. As shown in FIG. 9a, the upper workpiece 12 has an exterior planar upper or drill surface 18. Similarly the lower workpiece 14 has an exterior planar lower or shave surface 20.

Mounted on the frame 10 is an upper head indicated generally at 22 and a lower head indicated generally at 24. The upper head mechanism 22 is of a more or less conventional design. Thus, the upper head of the apparatus of the present invention is the same as that shown in U.S. Pat. No. 4,720,897 except that in the present invention rivets are manually fed to the rivet holder, rather than from a hopper. Thus, the upper head includes a drill spindle assembly indicated generally at 26 for drilling a rivet receiving hole or aperture in the workpieces 12, 14, 16. The drill spindle includes an electric motor 28 capable of rotatably driving a combined drill and countersink (not shown). The drill spindle assembly is mounted upon a transfer table which can be moved from a first position, where the drill spindle assembly is in concentric alignment with an upper pressure foot bearing assembly 30 as shown in FIG. 2, to a second position where an upper anvil (shown at 300 in U.S. Pat. No. 4,720,897) is in concentric alignment with the upper clamp pad 30. When the upper anvil is in its upper retracted position, it is disposed above a rivet holder (not shown) which can receive a rivet. During the operation of the present machine, a shear head (or flush head) rivet is typically placed within the rivet holder manually. However, it is possible to automate the process for installing the rivet within the rivet holder. The transfer table is caused to be moved between its first and second positions by cylinder 32 which also shifts the upper anvil between its raised retracted position and its lowered position. As the upper head mechanism is more fully described in U.S. Pat. No. 4,720,897, it will not be further described at this point.

Figure 4:
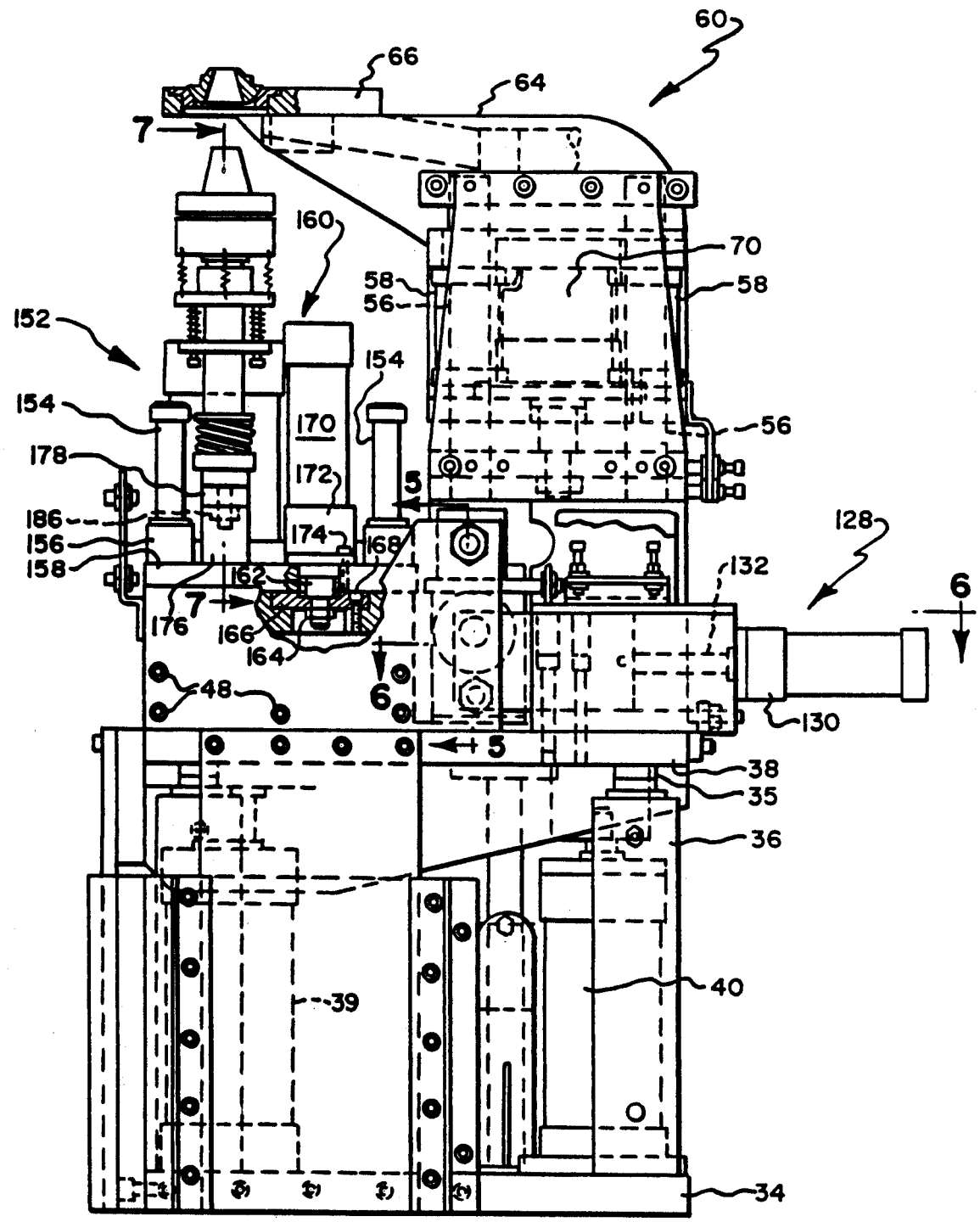
FIG. 4 is an enlarged side view of the lower head assembly shown in FIG. 2.

The lower head mechanism includes a base plate 34 which may be mounted upon a horizontally extending portion of the C-shaped main frame 10. Extending upwardly from the base plate 34 are four guide bushing assemblies which include cylindrical inner posts 35 and cylindrical outer guide tube assemblies 36, the posts 35 being movable with respect to the guide tube assemblies 36. The upper ends of the posts 35 are connected to a mounting plate 38. The mounting plate 38 can be moved up and down through the actuation of a hydraulic cylinder assembly 39 and a pneumatic cylinder assembly 40 (FIG. 4). The lift cylinder assemblies 39, 40 are used to transfer the lower head assembly between the stroke (retracted) and clamped (extended) positions. The guide bushing assemblies 35, 36 are located on the corners of the lower head mounting plate 38 and are used to guide and stabilize the lower head while the lift cylinders 39, 40 raise and lower the assembly. While the hydraulic lift cylinder 39 is positioned directly on the vertical workline of the riveter to efficiently react to the upset cylinder force, the pneumatic cylinder is positioned rearwardly to stabilize and maintain the mounting plate level when the lower head is in the raised or extended clamping position. Thus, the pneumatic cylinder 40 provides a constant force and also prevents a binding condition in the guide posts when raising and lowering the lower head. A slide assembly is mounted on the mounting plate 38, the slide assembly being indicated generally by reference number 41. The base portion of the slide assembly is secured to the mounting plate 38 by screws 42. The ends of the base portion of the slide assembly in turn support left-hand and right-hand end plates 44, 46, which end plates are secured in place by screws 48 which extend into the corresponding ends of the base portion of the slide assembly.

Mounted behind the slide assembly 41, on the base plate 38 is a mechanism for supporting a lower bushing assembly indicated generally at 50 in FIG. 2, the lower bushing support assembly being indicated generally at 52. This support assembly includes a welded base assembly 54 mounted upon the mounting plate 38. As best shown in FIG. 3, the base assembly in turn support four vertically extending guide pins 56 each of which in turn receive bushings 58 which support at a clamp pad frame indicated generally at 60. The clamp pad frame assembly includes left-hand and right-hand members 62 which are connected to the bushings 58, the members 62 in turn being welded to vertical frames 64, the vertical frames in turn being interconnected to upper and lower transversely extending frame members 66, 68, respectively. A pneumatic clamp cylinder 70 is disposed within the clamp pad frame 60, the upper end of the cylinder being interconnected with the clamp pad frame, and the lower end of the cylinder 70 being interconnected with the base assembly 54. As can best be seen from FIGS. 1 and 4, each of the vertical frame members 64 extend forwardly with the upper transverse frame member 66 having a portion disposed over the area between the guide assemblies 36. Centrally mounted upon the upper transverse frame member, which is provided with a forward aperture 72, is a clamp pad bearing seat member 74 which is provided with a through aperture 76 and a spherical bearing seat (no number) which receives a spherical bearing surface 78 of a clamp pad or lower bushing 80. The lower bushing 80 is provided with a conical pilot aperture 82 which is concentric with the spherical bearing surface 78. A rubber keeper sheet 84 extends over the junction line between the clamp pad 80 and the clamp pad bearing seat member 74, the radially outer periphery of the rubber keeper sheet being held in place by fasteners 86, and the radially inner portion of the rubber keeper sheet being held in place by an inner clamp ring 88 which is positioned about a cylindrical portion 90 of the clamp pad 80. Fasteners (not shown) may be used to secure the upper clamp ring in place. The upper surface 92 of the bushing 80 is planar and highly polished so it will not mar a workpiece when forced into contact with the workpiece.

The workpieces 12, 14, 16, which may be riveted together by the method and apparatus of this invention are initially placed between the pressure foot bearing assembly 30 and the lower bushing 80, and then the mounting plate 38 is raised by causing the cylinder assembly 39 to be extended. Next the cylinder assembly 70 is caused to be extended which will raise the lower clamp pad 80 into contact with the lower or shave surface 20 of the lower workpiece 14. If the surface 20 is at an angle to the upper surface or drill surface 18 of the workpiece, the spherical bearing surface will permit the lower clamp pad to rotate so that the upper surface 92 can conform to the workpiece. When this happens, the centerline 94 of the lower bushing will be disposed normal to the lower surface 20, thus positioning the centerline 94 perpendicularly to the surface 20.

The slide assembly 41 includes a transfer table 100 which is dovetail mounted to the base portion of the slide assembly 41. The table can be moved between right, left and intermediate positions by a hydraulic cylinder assembly indicated generally at 102. To this end the hydraulic cylinder assembly includes a cylinder 104 which is connected to rearwardly extending mounting plates 106, which mounting plates are carried by the rear side of the transfer table 100. The cylinder assembly 102 further includes a rod 110, the right-hand end of which passes through a suitable aperture in the right end plate 46 and is secured thereto by fastening means 112. It should be obvious that when the cylinder is fully extended the transfer table 100 will be disposed in its left-hand position as viewed in FIG. 3. Similarly, when the cylinder assembly 102 is fully retracted, the table 100 will be disposed in its right-hand position. These positions are determined by right-hand and left-hand stops 114, 116, respectively which stops will abut suitable right and left adjustable stops 118, 120 carried by the right and left end plates 46, 44, respectively. In order to prevent the transfer table from impacting the end plates 44, 46 with excessive force, right and left shock absorbers are provided, each of the right and left shock absorbers including a dash pot 122, a piston rod (no number) extending out of the dash pot, the piston rod being provided with a snubber 124 at the end remote from the dash pot, and a spring 126 disposed between the snubber 124 and dash pot 122.

Figure 5:
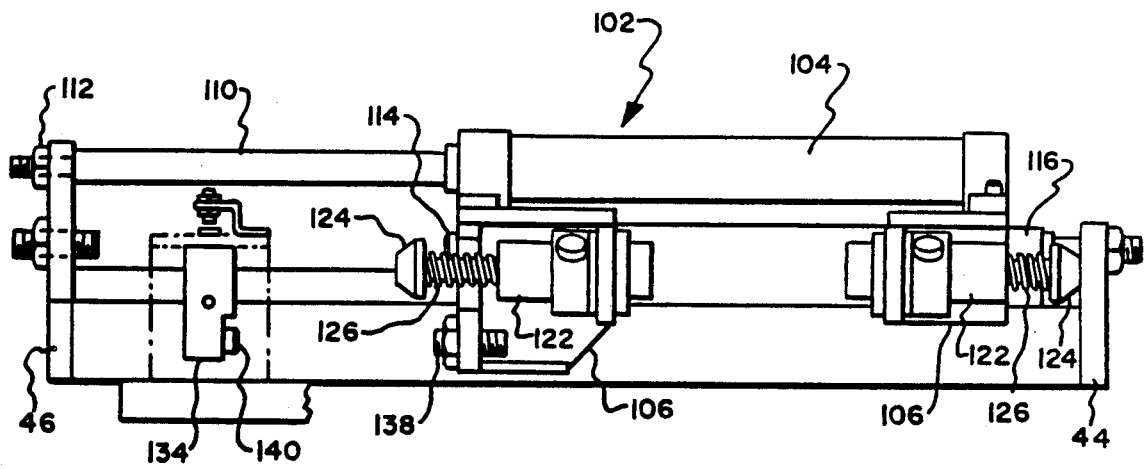
FIG. 5 is a sectional view taken generally along the line 5—5 in FIG. 4.
Figure 6:
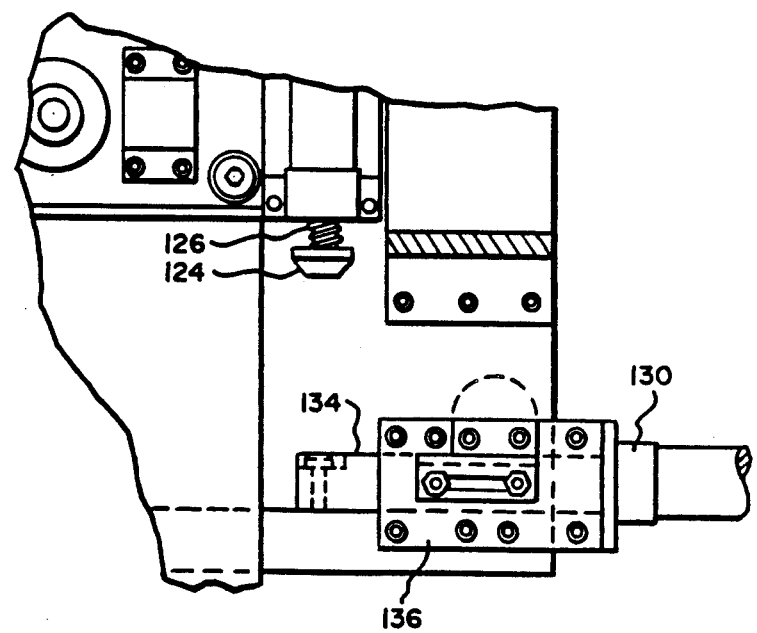
FIG. 6 is a sectional view taken generally along the line 6—6 in FIG. 4.

While right-hand and left-hand positions are determined by fully extending or retracting the cylinder assembly 102, an intermediate position can be established by moving the cylinder assembly 102 from the fully extended position shown in FIGS. 3 and 5 to a partially retracted position where a movable stop is engaged. To this end, a stop-air cylinder assembly 128 is provided, which air cylinder assembly includes a cylinder 130 (FIGS. 4 and 6) which is rigidly secured to a structure carried by the mounting plate 38. A piston rod 132 extends forwardly from the cylinder 130, which piston rod 132 is in turn connected with a movable stop 134 (FIGS. 5 and 6) which is disposed within a movable stop housing 136 for movement towards and away from the path of movement of the right-hand snubber 124 and mounting plate 106. Thus, as can be seen from FIG. 5, the right-hand mounting plate (disposed to the left in the figure) carries an adjustable stop 138 which is adapted to contact the stop button 140 carried by the movable stop 134. It should also be noted that when the movable stop is in its extended position, which will establish an intermediate stop position, that the right snubber 124 will initially contact the movable stop to slowdown the movement of the transfer table before it is fully stopped in its intermediate position.

From the above description it can be seen that the transfer table has three operable positions, these being the left-hand position (shown in FIG. 3), an intermediate position, and a right-hand position. Mounted upon the transfer table are three separate mechanisms, each of which will be in concentric alignment with the vertical workline when in one of the positions of adjustment.

These three mechanisms are a countersink mechanism indicated generally at 144, a lower anvil mechanism indicated generally at 142, and a shaving or shaver mechanism indicated generally at 144. The countersink mechanism is mounted on a spindle assembly which will permit the countersink on the bottom surface of the workpiece, best shown in FIG. 9c, to be formed normal to the lower surface of the workpieces.

The lower anvil mechanism 142 will operate along the vertical workline and will cooperate with the upper anvil to upset the rivet as shown in FIG. 9e. The shaving mechanism 144 is for the purpose of shaving the bucktail portion of the rivet so that it lies in a plane parallel to the shave surface 20 of the workpiece, the shaved surface being either flush with the surface or extending up to 2/1000 of an inch beyond the shave surface.

The lower anvil mechanism 142 is generally conventional and includes a lower anvil 146 which may be shifted from a lower inoperable position, shown in FIG. 3, to a raised operative position (not shown) by means of a hydraulic cylinder 148 which is mounted upon the transfer table. As this mechanism is known in the art, its details of construction will not be described further.

The shaver mechanism and countersink mechanism are essentially the same with the exception of the cutting tool which is mounted on the upper end thereof. Accordingly, these two devices will be described with reference to FIG. 7. Thus, when the mechanism is a countersinking mechanism, the cutting tool 150 will be a countersink. Alternatively, when the mechanism is a shaving mechanism, the cutting tool 150 will be a milling cutter or shaver.

The spindle mechanisms 140, 144 are essentially the same, with the exception of the specific cutting tool 150 carried by the mechanism. Each spindle 140, 144 is supported by a guide assembly indicated generally at 152. The guide assembly includes four guide bushing assemblies, there being a cylindrical shaft 154 for each of the guide bushing assemblies, and a cylindrical bushing 156 disposed about the shaft for vertical movement with respect to the shaft. The lower end of each of the bushings 156 is mounted upon a vertically shiftable base plate 158, the lower end of the shafts 154 passing through the base plate 158 and being secured to the top of the transfer table or slide mechanism. A hydraulic cylinder is disposed adjacent each of the mechanisms 140, 144, the hydraulic cylinder assembly being indicated generally at 160. Each cylinder assembly includes a piston rod 162 which is secured by a nut 164 to a mounting plate 166 secured to the top of the slide by fasteners 168. The cylinder 170 has a lower flange 172 which is in turn secured to the base plate 158 by fasteners 174. It should be apparent that if the cylinder assembly 160 were caused to be extended that the base plate 158 would be raised. Similarly, if the base plate were in a raised position and the cylinder were caused to be retracted the base plate would be lowered to the position shown in FIG. 4. Mounted upon each base plate 158 between the bushing shafts 154 is a saddle assembly including two vertical plates 176 and a transverse plate 178. The transverse plate 178 is provided with a vertically extending aperture which can receive a stud 180 and a cylindrical locating member 182 carried by an end cap 184 (FIG. 7), the stud being secured within the aperture by a nut 186 (FIG. 3).

Figure 7:
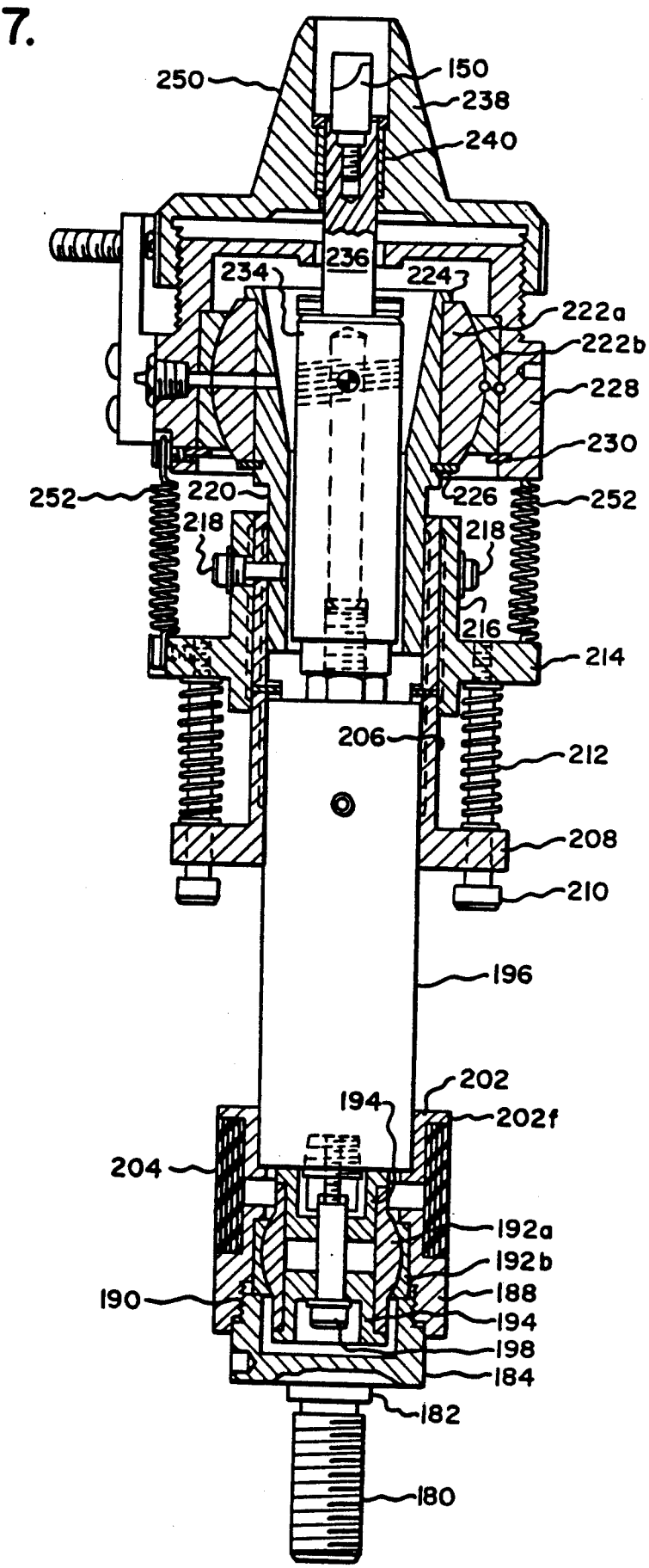
FIG. 7 is a sectional view taken generally along the line 7—7 in FIG. 4.

As can be seen from FIG. 7, which illustrates either spindle assembly 140 or 144, the end cap 184 is mounted on lower end of each of the mechanisms 140, 144. Thus, the spindle mechanism is secured for vertical movement only by the cylindrical locating member 182 within the aperture on the transverse plate 178 and by nut 186. However, these parts are so designed that when so secured, the mechanism 140 or 144 will be in aligned relationship with the vertical workline when the transfer table has been indexed to its proper position.

Each of the spindle mechanisms 140, 144 further includes a bearing housing 188 screwed onto the end cap 184 and secured in place by a setscrew 190. Mounted within the bearing housing is a spherical bearing assembly 192a, 192b. The inner member of the spherical bearing assembly has a cylindrical bore and receives bearing retainers 194. The lower end of a pneumatic motor 196 is secured to the bearing retainers 194 by a screw 198 which passes through the bearing retainers 194 and received by a plug nut 200 at the lowermost end of the pneumatic motor. The motor 196 may be a Dotco Series 21 pneumatic motor. A spring seat 202 is mounted on the lowermost end of the pneumatic motor, the spring seat having a flange 202f which bears against a rubber-like flexible base 204.

Secured to the upper end of the motor housing 196 is a motor clamp sleeve 206 which may be secured in any conventional manner. The clamp sleeve 206 is provided with a lower radially outwardly extending flange 208 which is suitably apertured for the reception of shoulder screws 210, there being a springs 212 disposed about the cylindrical portion of each shoulder screw 210. One end of each of spring bears against the flange 208. The other end of each of the springs 212 bears against a flange 214 on spring sleeve 216. A plurality of screws 218 pass through the spring sleeve 216, and a slotted portion of the motor clamp sleeve 206, the inner ends of screws 218 being received within a slide shaft 220. The slide shaft carries at its upper cylindrical end a spherical bearing assembly 222a, 222b the inner portion of which is trapped between a flange 224 on the upper end of the slide shaft 220 and a retaining ring 226. Mounted upon the outer portion of the bearing assembly 222 is a bearing housing drive end 228 which is held in place in part by a further retaining ring 230.

The motor 196 is provided with an upwardly extending drive shaft 232 which is coupled to a flexible shaft coupling such as a helical flexible shaft coupling manufactured by Helical Products Company, Inc. of Santa Maria, Calif. The upper end of the shaft coupling is provided with an upwardly extending shaft 236 which passes through a centrally located aperture in the bearing housing drive end, the upper end of the shaft receiving a cutting tool 150 which may be either for countersinking or shaving. A cutter pilot 238 is disposed about the output shaft 236 of the flexible coupling 234, the cutter pilot being secured to bearing housing drive end 228. A sleeve bushing 240 carried by pilot 238 is engaged by the rotatable shaft 236.

OPERATION

The workpieces which are to be riveted by the double-flush riveting mechanism of this invention are placed between the upper and lower clamp pads 30, 80. The cylinder 39 and 40 will then be extended to raise the mounting plate 38. Then the cylinder 70 will be extended to cause the lower clamp assembly 80 to bear against the the lower surface of the workpieces to securely clamp the workpiece between the upper and lower bushings 30, 80. When this operation occurs, if the lower or shave surface 20 is at an angle with respect to the upper or drill surface 18 of the workpiece assembly, the clamp pad 80 will rotate up to 10 degrees to normalize its position. At this point it should be noted that various controls are mounted within control housings 244, 246, and 248, these various control systems being interrelated to each other and controlling the pneumatics, hydraulics, and electrical circuits of the apparatus. In addition, various limit switches are provided throughout the mechanism to sense various positions to ensure the proper of the device during operations.

Figure 8:
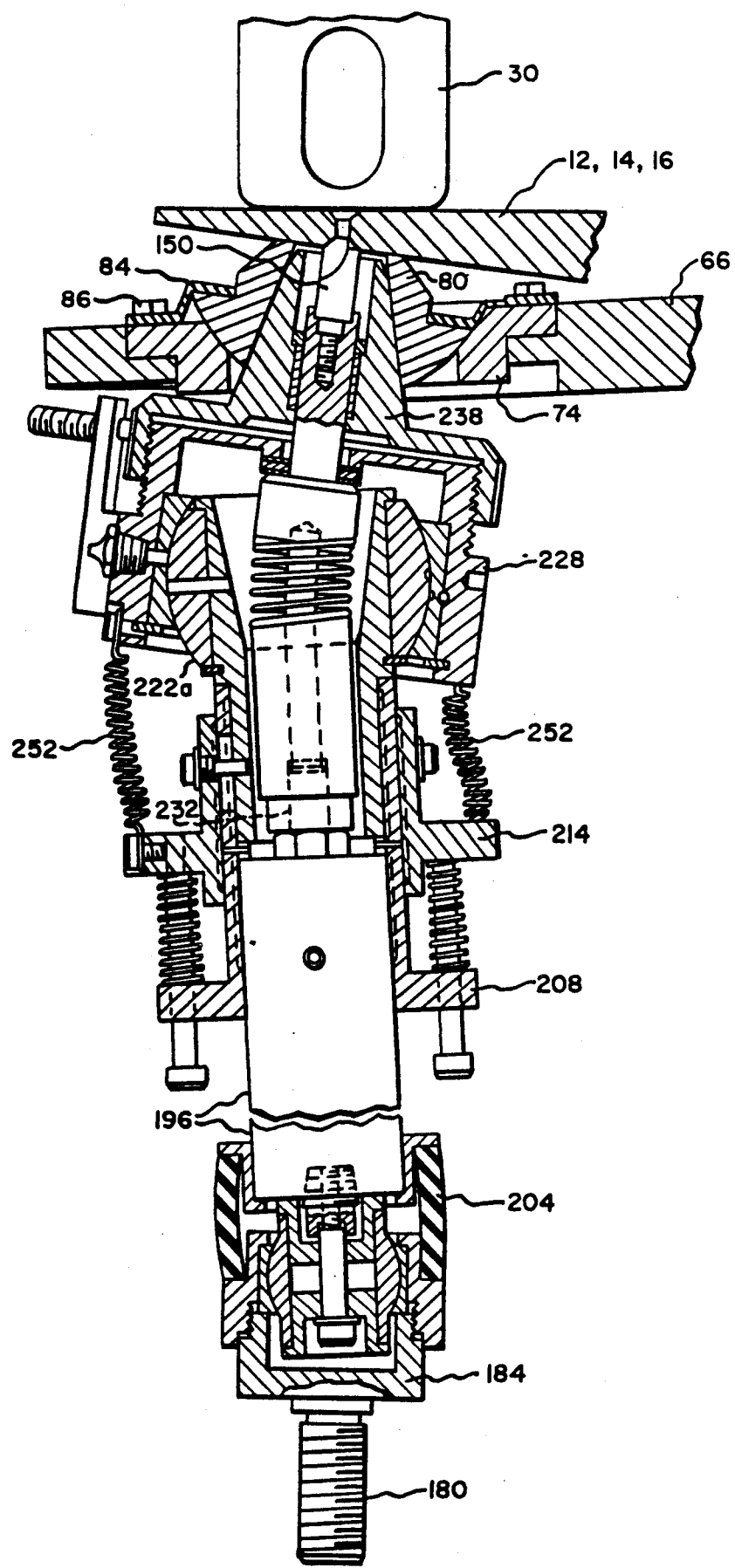
FIG. 8 is a partial assembly view illustrating the relationship of the parts when the workpieces which are being riveted together have exterior surfaces disposed at an angle of approximately 10 degrees with respect to each other, and the countersink in the lower surface is being completed.

After the workpieces have been properly clamped during the initial phase, the upper transfer table will be in its initial position with the drill spindle 26 concentric with the vertical workline. The spindle will now be caused to rotated and lowered to drill and countersink the workpieces, the parts being retracted after completion of the drilling operation, the completion of this step being illustrated in FIG. 9b. With the lower transfer table in its initial position, as shown in FIG. 3, the countersink mechanism 140 will now be extended by operation of the hydraulic cylinder assembly 160 to cause the countersink mechanism to move upwardly. As the mechanism moves upwardly, the cutter pilot, which has a conical surface 250 which conforms to the conical surface 82 of the clamp pad 80 is captured by the clamp pad in a close-tolerance relationship which pilots the cutting tool into a position wherein it is perpendicular to the shave surface 20 so that as the countersink is formed within the lower workpiece 14 the axis of the countersink will be perpendicular to the shave surface 20. The relationship of the various parts at the completion of the lower surface countersinking operation are shown in FIG. 8. At the completion of the countersinking operation, the cylinder 170 will be retracted and the countersink mechanism 140 will return to the position illustrated in FIG. 3 due to the action of the springs 252 which extend between the flange 214 on the spring sleeve 216 and the lower end of the bearing housing drive end 228.

The transfer mechanism on the upper head will now be shifted by operation of cylinder 32, and the rivet, which was placed in the rivet holder at the beginning of the operation, will be forced downwardly into the drilled and countersunk aperture in the workpiece. When this operation is complete, the upper anvil will bear against the upper end of the rivet and will be held in place momentarily.

The lower transfer table will be indexed to its intermediate position and then the lower anvil will be extended upwardly while the upper anvil is in its down position to upset the rivet as shown in FIG. 9e. After the rivet has been upset, the lower anvil will be initially retracted and then the lower transfer table will then be moved to its third position to place the centerline of the shaving mechanism 144 in vertical alignment with the vertical workline at which time the shaving mechanism will be caused to be rotated and to be raised to shave the rivet head flush and normal to the surface 20.

While a preferred structure in which the principles of the present incorporated are shown and described above, it is to be understood that the invention is not to be limited to the particular details shown and described above, but that, in fact, widely different means may be employed in the practice of the broader aspects of this invention.

What is claimed is:

1. A method of riveting two workpieces together, which workpieces when riveted together have a first exterior drill surface and a second opposed exterior shave surface, the first and second exterior surfaces not being parallel to each other when the workpieces are assembled together; the method comprising the following steps:

clamping the first and second workpieces together;
   drilling an aperture through the workpieces at right angles to the plane of the drill surface and countersinking the drill surface about said aperture at right angles to the plane of the drill surface;
   countersinking the shave surface about said aperture with the centerline of the countersink on the shave surface side being at right angles to the plane of the shave surface;
   inserting a rivet through said aperture;
   upsetting the rivet while in said aperture; and
   shaving the upset portion of the rivet which extends beyond the shave surface of the workpieces so that the shaved surface of the rivet is parallel to the shave surface of the workpieces.

2. The method as set forth in claim 1 wherein the upset portion of the rivet which extends beyond the shave surface of the workpieces is shaved by a milling machine cutter, the cutter rotating on an axis concentric with the axis of the countersunk portion and perpendicular to the plane of the shave surface of the workpieces during its cutting operation.

3. An apparatus for riveting two workpieces together, which workpieces when riveted together have a first exterior drill surface and a second opposed exterior shave surface, the first and second exterior surfaces not being parallel to each other when the workpieces are assembled together; the apparatus comprising:

clamping means for clamping the first and second workpieces together;
   drilling and countersinking means for drilling an aperture through the workpieces at right angles to the plane of the drill surface and for countersinking the drill surface about said aperture at right angles to the plane of the drill surface;
   means for countersinking the shave surface about said aperture with the centerline of the countersink on the shave surface side being at right angles to the plane of the shave surface;
   means for inserting a rivet through said aperture;
   means for upsetting the rivet while in said aperture; and
   means for shaving the upset portion of the rivet which extends beyond the shave surface of the workpieces so that the shaved surface of the rivet is parallel to the shave surface of the workpieces.

4. An apparatus for riveting two workpieces together, which workpieces when riveted together have a first exterior drill surface and a second opposed exterior shave surface, the first and second exterior surfaces not being parallel to each other when the workpieces are assembled together; the apparatus comprising the following:

a C-shaped frame;
   an upper head assembly carried by the frame, an upper clamp mounted on the upper head assembly and movable between a raised operative position and a lower clamping position, an upper transfer assembly mounted on the upper head assembly, drilling and countersinking means mounted on the upper transfer assembly, an upper ram mounted on the upper transfer assembly, means to move the transfer assembly between a first operative position where the drilling and countersinking means is in line with the upper clamp means and a second position where the upper ram is in line with the upper clamp means, and rivet holding means capable of holding a rivet and subsequently guiding a rivet towards a workpiece engaged by the upper clamp means after an aperture has been drilled into the workpiece; and
   a lower head assembly including table means movable between a lower position and a raised position, means to raise and lower the table, a lower clamp pad assembly carried by the table, the clamp pad assembly including a clamp pad having a planar workpiece engaging surface on a workpiece engaging side of the pad, and a first spherical bearing on which the clamp pad is mounted so that the clamp pad may have its workpiece engaging surface in intimate contact with the workpiece when the lower clamping pad assembly is in its operative position, means to move the lower clamp pad assembly towards and away from the table, the clamp pad further including a conical aperture extending through the pad, the conical aperture having a centerline perpendicular to the workpiece engaging surface, a transfer mechanism mounted upon the table and movable between countersink positions, upset positions, and shave positions, a lower ram mounted upon the transfer mechanism and shiftable between inoperative and upsetting positions, and countersinking and shaving mechanisms being mounted on the transfer mechanism, each of the countersinking and shaving mechanisms including an apertured second spherical bearing provided with a conical pilot portion engageable with the conical aperture on the lower clamp pad for guiding the conical portion, a drive motor, a flexible output shaft having a cutting tool mounted on the outer end, a portion of the flexible shaft passing through the pilot portion mounted on the second spherical bearing, which pilot portion is capable of guiding the cutting tool to a position perpendicular with respect to the surface engaged by the lower clamp pad assembly.

5. Apparatus for machining a workpiece by a rotatable mechanism, said apparatus ensuring the axis of rotation is perpendicular to a generally planar surface of the workpiece; said apparatus comprising:
- a clamping bushing having
  - a conical aperture extending therethrough, and
  - a generally planar workpiece engaging surface on the bushing, the workpiece engaging surface being at right angles to the centerline of the conical aperture;
- mounting means for mounting a bushing for movement so that when the workpiece engaging surface is brought into initial contact and then into full contact with the generally planar surface of the workpiece the workpiece engaging surface on the bushing can conform to the surface of the workpiece;
- a rotatable machining mechanism; and
- support means for tiltingly supporting the rotatable machining mechanism, the support means including a conical pilot portion which may be received within the conical aperture to dispose the axis of the rotatable mechanism perpendicular to the workpiece engaging surface.

* * * * *